F. B. LITTLE.
ELECTRIC CURRENT CONTROLLING DEVICE.
APPLICATION FILED FEB. 8, 1918.
1,319,880.
Patented Oct. 28, 1919.
4 SHEETS—SHEET 2.
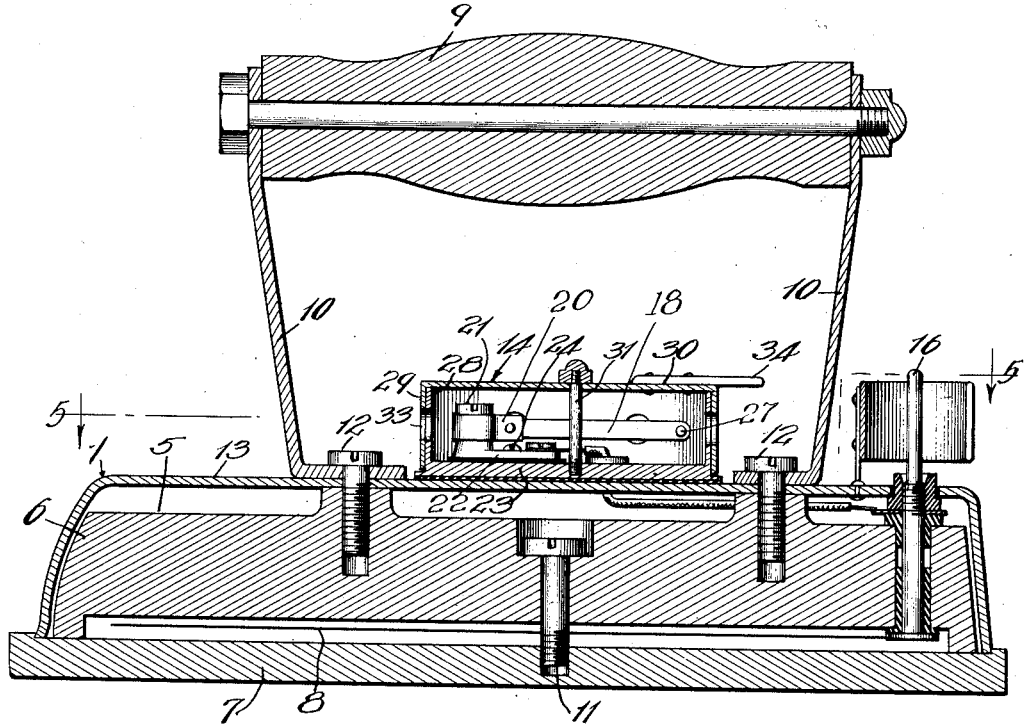

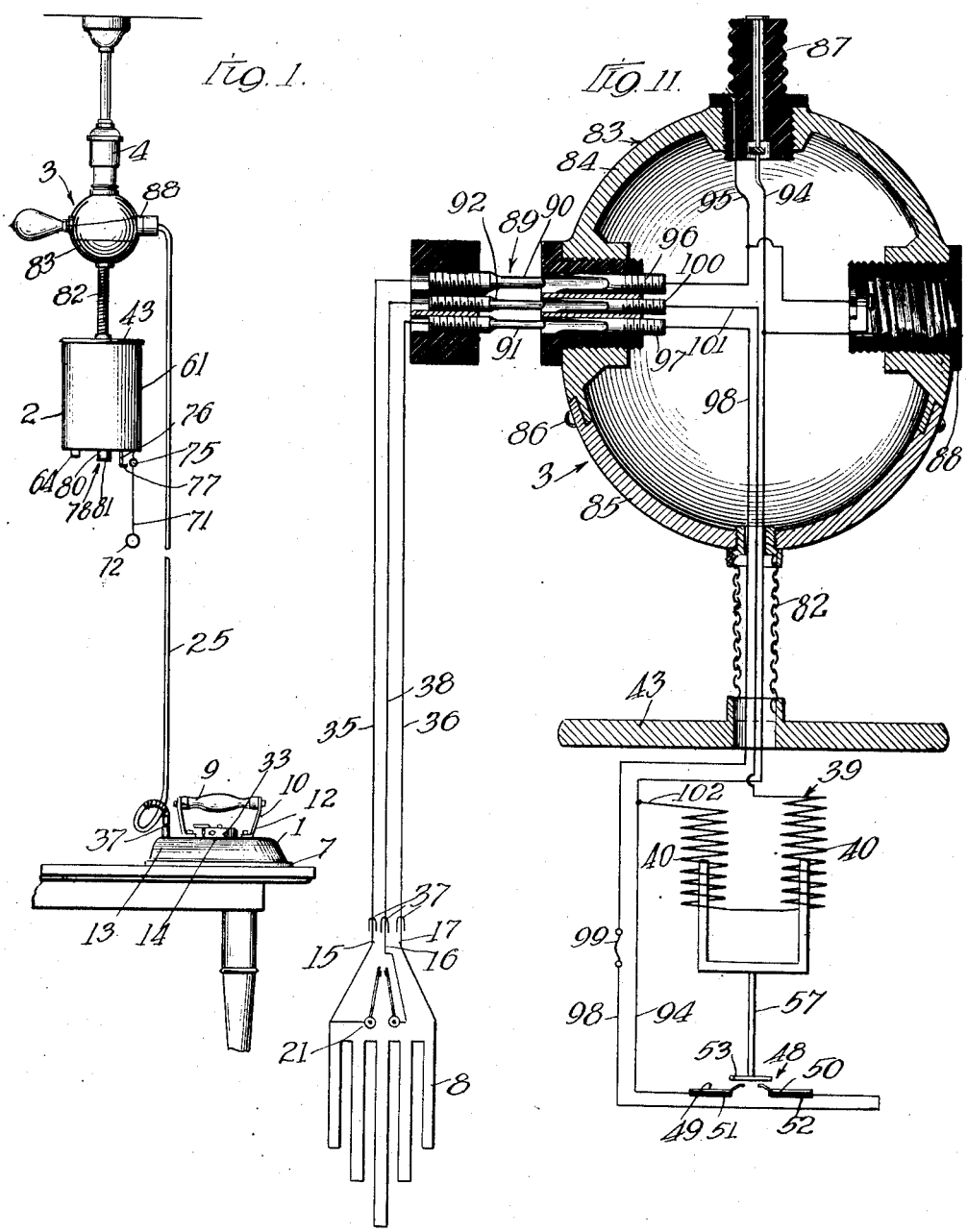

F. B. LITTLE.
ELECTRIC CURRENT CONTROLLING DEVICE.
APPLICATION FILED FEB. 8, 1918.
1,319,880.
Patented Oct. 28, 1919.
4 SHEETS—SHEET 3.
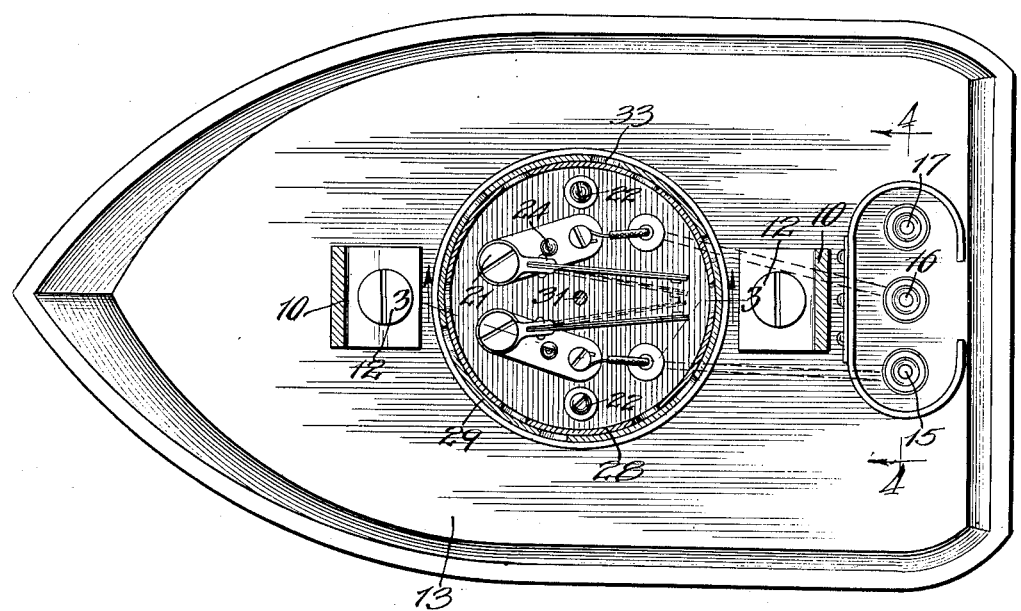
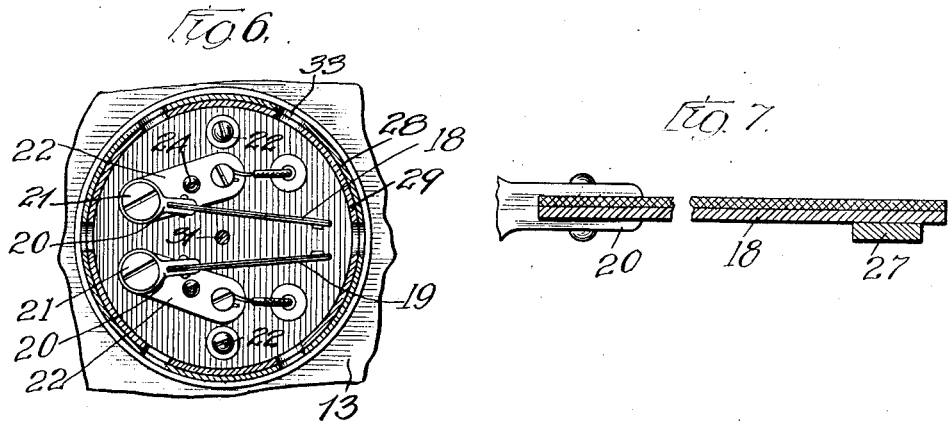
Witnesses:
W. F. Kilroy
Harry R. L. White
Inventor
Frederick B. Little
By Edward Jay Wilson
Atty.

F. B. LITTLE.
ELECTRIC CURRENT CONTROLLING DEVICE.
APPLICATION FILED FEB. 8, 1918.
1,319,880.
Patented Oct. 28, 1919.
4 SHEETS—SHEET 4.
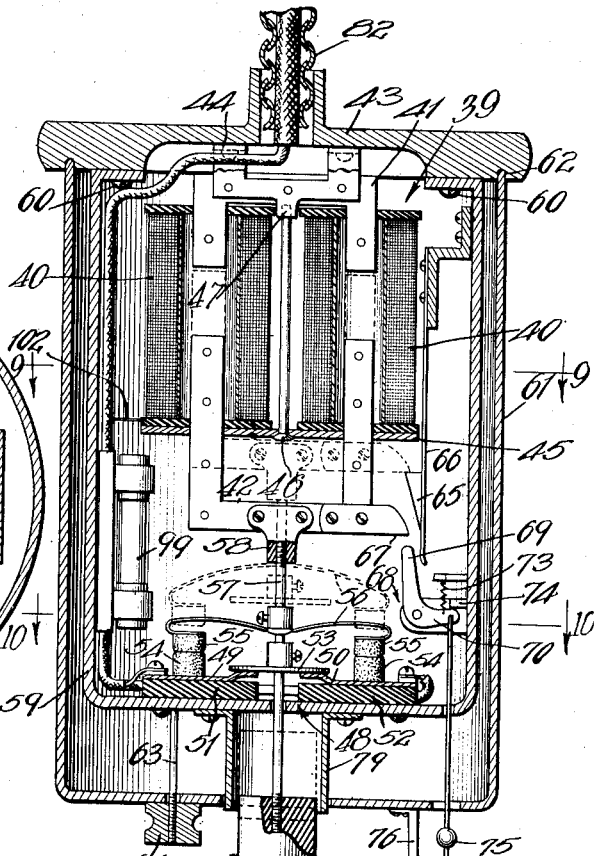
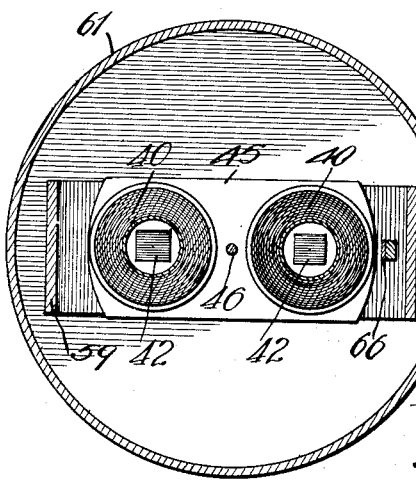
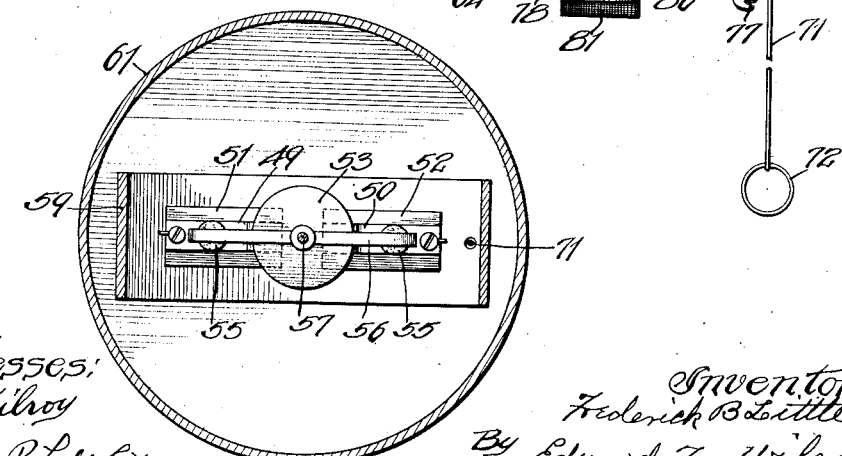

UNITED STATES PATENT OFFICE.

FREDERICK B. LITTLE, OF CHICAGO, ILLINOIS.

ELECTRIC-CURRENT-CONTROLLING DEVICE.

1,319,880.  Specification of Letters Patent. Patented Oct. 28, 1919.

Application filed February 8, 1918. Serial No. 215,994.

*To all whom it may concern:*

Be it known that I, FREDERICK B. LITTLE, a citizen of the United States, and a resident of Chicago, county of Cook, and State of Illinois, have invented certain new and useful Improvements in Electric-Current-Controlling Devices, of which the following is a specification.

My invention relates to improvements in electric current controlling devices and has special reference to means for controlling the supply of electric current to electrically heated household flat irons and such like current using mechanisms.

Among the several objects of my invention are to provide an electric current control which shall be automatic in its action; which shall be capable of being constructed of any desired capacity of current; which shall have no fragile or easily destructible part exposed to the heat; and which shall be simple in construction and durable and positive in operation.

A further object of my invention is to provide an automatic electrically operated circuit breaker for an electric circuit, which includes a heating unit, and so arranged that no delicate part easily destroyed by heat shall be exposed to the heat of said heating unit.

It is a further object of my invention to provide means for changing the action of the circuit breaker mechanism so that it will either act to permanently break the circuit or to continuously alternate the cutting off and turning on of the electricity in accordance with the temperature desired to be maintained.

A further object of my invention is to provide means for automatically controlling the temperature of electrically heated flat-irons and such like devices; to increase the efficiency of such irons; to decrease the danger of overheating; and to decrease the quantity of electrical energy consumed.

In other words, it is my object to provide an electrically heated flatiron which shall be economical in the use of electric current; which shall be highly efficient; which cannot be overheated; and from which the electricity will automatically be cut off when the iron reaches a predetermined temperature.

It is also my object to provide means for regulating the temperature of the iron to correspond with the necessary temperature for various fabrics.

It is further my object to provide simple means for indicating visually whether or not the current is on or off.

Further objects of my invention will appear hereinafter.

My invention consists in an electric circuit system including a thermally affected circuit closer, arranged to be subject to the heat produced by a heating device in said system, an electric circuit breaker in circuit with the heater, and electric means controlled by the thermal contact closer for operating the circuit breaker.

My invention also consists in a primary or main electric circuit and a secondary or shunt circuit, the main circuit containing an electric heating unit and a circuit breaker, and the secondary circuit containing a contact closer subject to the temperature of the heating unit, and an electro-magnetic device adapted to control the said circuit breaker and whereby the operation of the heating unit is automatically controlled as to temperature.

My invention also consists in an electric sad-iron having mounted thereon, and subject to the heat thereof, a circuit closer, an electro-magnetic circuit breaker not subject to the heat of the iron and controlled by said circuit closer, the circuit breaker controlling the flow of the electricity to the heating unit of the iron.

My invention also consists in an electric iron, a thermal circuit closer thereon connected with a device for controlling the flow of electricity to the heating unit of the iron, and means for changing the sensitiveness or quickness of action of said circuit closer.

My invention also consists in mounting the closer within a closed space so arranged that the space can be opened to the atmosphere more or less for changing or adjusting the action of said closer.

My invention also consists in a circuit breaker for the purpose specified, arranged normally to make and break the circuit to the heating unit as needed to maintain a certain predetermined temperature, and provided with means, adjustable at will, to cause the main circuit to remain open once it has been broken.

My invention also consists in a unique visual signal indicating whether the main circuit is open or closed.

My invention also consists in the several features of construction and in the arrangements of devices, parts, mechanisms and circuits by which I am enabled to attain the above mentioned and other objects and all as hereinafter described and particularly pointed out in the appended claims.

My invention will be more readily understood by reference to the accompanying drawings forming part of this specification and in which:—

Figure 1 is a view in elevation of an electrically heated flatiron, and circuit breaker illustrating one application of my invention;

Fig. 2 is a longitudinal substantially central section of an electrically heated flatiron arranged for and equipped with a circuit closer forming part of my invention;

Figs. 3 and 4 are fragmentary vertical sectional views on the line 3—3 and 4—4 respectively of Fig. 5;

Fig. 5 is a horizontal section on the line 5—5 of Fig. 2;

Fig. 6 is a fragmentary horizontal section on the line 6—6 of Fig. 3;

Fig. 7 is an enlarged detail horizontal section of one of the thermostatic arms or members;

Fig. 8 is a vertical substantially central sectional view of the electro-magnetic circuit breaker forming part of my invention;

Figs. 9 and 10 are horizontal sectional views on the lines 9—9 and 10—10 respectively of Fig. 8; and Fig. 11 is a diagrammatical view of the electric circuits and a central vertical sectional view of the circuit connector illustrated in Fig. 1.

In said drawings 1 is an electrically heated flatiron which may properly represent any device provided with an electric heating element; 2 is the electro-magnetic circuit breaker; and 3 is the connecting box or device which I have devised for conveniently connecting the iron and the circuit breaker to a source of electricity such as an ordinary lamp socket 4.

The iron 1 comprises a body 5 of the ordinary form consisting of a heavy metal heat retaining member 6, a bottom smoothening plate 7, and an electric heating element 8 arranged above the plate and below the member 6 in a closed space provided for it. The iron is provided with the usual handle 9 supported above the body on standards 10. The plate 7 is secured to the member 6 by a screw 11, and the standards are secured in place by screws 12. A thin metallic cover 13' is formed to inclose the member 6 and is secured by the screws 12, being interposed between the standards and the member 6 in the usual manner. Beneath the handle 9 and between the standards I arrange a thermally operated circuit closer or thermostat 14, and instead of the usual two electric posts or connectors at the rear part of the iron I arrange three posts 15, 16, and 17. The heating element 8 is connected in the main circuit, and for this purpose one terminal is connected to one outside post 15 and the other terminal to the other outside post 17.

The thermostat consists of a pair of compound metallic bars 18, 19 of peculiar construction each mounted rigidly at one end in a holding member 20 adapted to be clamped by a vertical screw 21 upon a plate or bar 22. These plates 22 are secured upon a common base plate 23 by screws 24 but out of electric contact with each other and with the base plate 23. The plates 22 form the terminals of the thermostat, and one thereof is connected to one of the terminals 15 of the heating unit, and the other thereof is connected to the central connecting post 16 at the rear of the iron and through suitable wires with the electro-magnetic circuit breaker as more fully described hereinafter.

A flexible cable 25 connects the iron with the connector 3, and a cable 26 connects the connector 3 with the circuit breaker 2.

The thermostat arms or bars 18 and 19 are rigidly mounted, opposed to each other, by screws 21, and they can be readily adjusted to arrange their opposed free ends at the desired distance apart to give the best results.

These bars, as best illustrated in Fig. 7, are each made up of two metals such as copper or copper and nickel or German silver or other metals which expand different amounts for the same changes of temperature. The bars illustrated have the copper or copper on the outside and the nickel or German silver on the inside so that a rising temperature will cause the free ends of the bars to approach each other and close the circuit in which the thermostat is arranged. The bars are preferably made from plates which are formed by rolling down a bar made of the two metals integrally united to each other and, except for the difference in the metals, making a single metallic plate. I have found that in this way I obtain the greatest efficiency in the deflection of the arms due to changes of temperature; also the arms are comparatively cheaply produced in this manner.

To prevent corrosion at the contact points of the arms, I provide the opposed free ends thereof with suitable metallic contacts 27, such as platinum, silver, etc.

By means of the two arms 18 and 19 I am enabled to provide a contact closer which is exceedingly sensitive, one which positively closes the circuit with considerable pressure, and one, due to the outer movement of the two arms, which opens the circuit practically instantaneously, providing a gap wide enough to prevent all possibility of arcing, particularly with the usual voltages ordinarily used for this and similar purposes.

I inclose the thermostatic device in a box or cover to protect it from damage and to provide a delicate means of regulating or adjusting the temperature of the iron.

This cover consists of a circular upstanding rim 28 on the base 23, and a cylindrical outside cover 29 closed at its top by an upper wall 30. I hold the cover member 29 on the base 23 by a central screw or bolt 31. The cover 29 can be rotated about the base 23, and I provide a number of openings 32 in the upstanding wall 28 and similar openings 33 in the cylindrical wall of the cover 29 adapted to register with the holes 32 to open the cover for ventilation. I also provide the cover 29 with a fiber or similar non-heat conducting handle 34 by means of which the cover can be readily adjusted in position to regulate the amount of ventilation which in turn controls the temperature within the thermostatic box. When all ventilation is shut off by the holes being closed, the device sooner reaches a temperature at which the arms 18 and 19 close together and this causes the operation of the circuit breaker to cut off the current from the heating unit in the iron, and when the ventilating holes are more or less open the action is comparatively slower or quicker as desired.

I am by this means enabled to make the thermostatic device more or less sensitive and thus to maintain the iron at a temperature suitable for different purposes or fabrics The cable 25 is made up of the main circuit wires 35 and 36 which are connected by means of suitable sockets in a suitable block 37 with the posts 15 and 17 respectively, and a wire 38 which is similarly connected with the middle post 16. To prevent a misplacement of the connections at this point, I offset the middle post as shown so that the sockets can only be placed upon the posts in one manner.

The circuit breaker 2 comprises an electro-magnetic device such as a solenoid 39, in the form shown, composed of two shunt or high resistance spools 40 mounted parallel with each other and having a fixed laminated U-shaped core 41 at the upper end and a movable similar core 42 at the lower end. This electro-magnetic device is mounted upon a rigid base 43 by means of a rigid bracket or connector 44 to which the fixed core 41 is secured. I hold the spools in place upon the fixed core by means of the plate 45 and central screw 46 which screws into a projection 47 provided on the bracket 44.

The spools 40 are connected in circuit with the thermostat 14 and when the arms 18 and 19 contact with each other the movable core 42 is pulled up.

Below the electro-magnetic device 39 I arrange a circuit breaker 48 in circuit with the heating circuit 8 and consisting of opposed contact plates 49 and 50 secured respectively on insulating blocks or bases 51 and 52.

I provide two means of electrically connecting these contact plates, one through the medium of the metallic bar or plate 53 adapted to metallically connect the plates, and the other through the medium of pairs of carbon contacts, each consisting of a carbon block 55 secured to the opposite ends of a spring bar 56. The spring bar is carried by a vertically movable rod 57 depending from the movable core 42 and secured thereto through the medium of a non-conducting block or connector 58. The blocks 51 and 52 are rigidly mounted on a bail or frame 59 which extends up to the base plate 43 to which it is rigidly secured by screws 60.

To protect the whole apparatus, I provide a cylindrical casing or cover 61, its upper edge fitting into a circumferential groove 62 in the base 43 and adapted to be held in place by the screw 63 and nut 64. The screw 63 is mounted in and depends from the bracket 59.

When the arms 18 and 19 make a contact or close the shunt circuit, the movable core is drawn up and the connection between the contact plates 49 and 50 is broken as follows: First, the plate 53 is lifted free of the opposed ends of the contact by means of the rod 57 to which it is rigidly attached, thus greatly increasing the resistance between the two plates, as the only path for the main circuit to flow is through the carbon contacts and spring 56. But as the circuit is not yet fully opened no sparking effect is produced. As the core 42 continues to rise the spring or yielding bar 56 straightens out and finally lifts the blocks 55 free of the blocks 54, thus completely opening or breaking the main or heating circuit.

It will now be obvious that when no means of holding the core 42 in its raised position, other than the electro-magnetic device, is provided, that immediately upon the cooling of the iron, due to the cutting off of the electricity, the arms 18 and 19 will separate thus breaking the scondary or shunt circuit and the core 42 will then fall and thus again complete the main or heating circuit. It is also obvious that this alternate breaking and making of the heating circuit would continue as long as the iron continues to change its temperature between certain predetermined limits.

Under certain circumstances it is desirable to provide means arranged to prevent the making of the main circuit once it has been broken unless the same is intentionally made, and for this purpose I provide a latch or stop 65 mounted upon a yielding member 66 and in the path of a projection 67 carried by the movable core 42. The latch 65 and projection 67 have oppositely inclined surfaces adapted for freely passing each other, due to the yielding of the support 66, as the core 42 rises, and when the core reaches the upper limits of its movement the projection 65 springs in beneath the projection 67 and retains the core in its raised position. The current breaker 48 is thus maintained open once the thermostatic device operates to open it.

To manually close the main circuit I provide a bell-crank 68 pivotally mounted on the frame 59 and having an arm 69 adapted to engage the free end of the spring 66 and to force the latch 65 out of the path of the projection 67, and provided with a horizontal arm 70 to which I connect a cord or chain 71 depending from the circuit breaker and provided at its lower end with a ring 72 for convenience in pulling it down.

I hold the bell-crank normally disengaged from the spring 66 by a small spring 73 attached to the horizontal arm 70 and tending to raise same into contact with a stop 74. As shown in full lines in Fig. 8, should the core 42 rise it will be held up until manually released.

In order to arrange the circuit breaker so that it will act automatically to make and break the main circuit in response to changes of temperature of the iron, I provide means for holding the latch 65 out of the path of the projection 66. This means consists in a small ball or obstruction 75 fixed to the cord 71 below the casing 61 and a depending arm 76 fixed to the casing 61 and provided with a forked end 77 adapted to receive the cord 71 between its tines and to engage the ball 75 and so arranged that when the cord 71 is drawn down to release the latch 65, the cord 71 can be swung into the fork 77 and the ball 75 will be held beneath the fork 77 in such a manner that the cord cannot rise until the ball is manually released. In order to permit the casing 61 to drop down far enough to expose the devices inclosed therein, I provide a hole in the lower part thereof large enough to permit the ball 75 to pass through the casing and the casing then slides down the cord 71 and is held there by the ring 72.

In order to visually indicate when the circuit breaker is set for the current to be on or off the heating unit I provide an indicating member 78 connected rigidly with the lower end of the rod 57 and adapted to be projected below the lower wall of the casing 61 in plain sight. Preferably the member 78 is cylindrical in form and is movable up and down in a guide cylinder 79 fixed to and depending from the frame 59 and adapted to receive the lower part of the casing 61 and center same. I preferably make this indicating member of some non-conducting material such as fiber, and I make the upper part 80 thereof white and so arranged, as shown in full lines in Fig. 8, to project in full view when the circuit is closed, and to be drawn up within the cylinder 79 and hid from view when the circuit is open or the circuit is off. To add to the effectiveness of the indication, I make the lower end 81 of the indicator of a contrasting color such as black so that when the current is off only a black signal will be seen.

I hang the circuit breaker 2 to the connector 3 by a flexible connection 82 so that in whatever relation it may be necessary to place the connector 3, in order that the screw plug may enter the lamp socket, the circuit breaker can always hang in a vertical position, as shown, as this is the position in which the movable core 42 best operates.

The connector 3 comprises a separable shell casing 83 in which the various wires may be connected and hidden. I make it of an upper part 84 and a lower part 85 connected together below the horizontal center by the screws 86 so that the two parts are readily separable. In the upper part I provide a screw plug 87 adapted to be screwed into an ordinary lamp socket 4 and affording the connection through which current is supplied. At one side I provide a socket 88 similar to the usual form of screw lamp socket, so that when it is necessary to secure the current from a lamp socket, such as a drop light in the kitchen, there will be provided a socket in which a lamp may be used.

At the opposite side of the shell I provide a three socket plug connection 89 having one connection 90 for the wire 35 and another one 91 at the opposite side of the wire 36 for the circuit of the heating element 8, and a middle post connection for the shunt wire 38. I make one of the outside posts as 90 larger than the opposite outside post so that the plug and its socket can go together in only one manner.

I secure the flexible connection 82 in the lower part of the casing to the screw plug 92. Two circuit or current supply wires 94 and 95 lead into the casing from the screw plug 87. I branch from these to the screw socket 88 for a lamp. One of these wires as 94 extends through the casing and flexible connection 82 into the circuit breaker and is connected with the first contact plate 49 of the circuit breaker. The other wire 95 is connected directly to the contact socket 96 in which the post 92 of the connection 89 enters and thus the supply wire 95 is connected to the heating element through the wire 35. The other contact plate 50 of the circuit breaker is connected to the contact socket 97 in the connection 89 by the wire 98, which socket receives the contact post 91 and is thus connected with the opposite terminal of the heating element 8 through the wire 36. I interpose a fuse 99 in the wire 98 to protect the circuit breaker from a short circuit in the iron.

The center post 92 of the connection 89, which is connected with one terminal of the thermostat, enters the socket connection 100, which is connected by the wire 101 with one terminal of the shunt coils 40 of the electro-magnetic device, and the other terminal 102 thereof is connected directly to the supply wire 94, thus putting the thermostat and coils in circuit together and in shunt to the heating element.

It should now be clearly understood that, by means of my invention, I am enabled to provide an electric iron or other like device, so arranged and controlled that there is no danger of overheating, that the delicate mechanisms and parts, such as the shunt coils and other like parts, which might be easily destroyed by excessive heat or relatively high temperatures, are not subject to the heat of the heating element, and also that I am enabled to operate and control the iron in a particularly efficient and satisfactory manner. Also that, under the system of control described, the iron will be highly efficient and economical in operation.

As many modifications of my invention will readily suggest themselves to one skilled in the art, I do not limit or confine my invention to the specific structures and arrangements of devices and parts herein described.

I claim:

1. The improvements herein described, comprising a main circuit, a shunt circuit, electro-magnetic means controlled by the shunt circuit, a circuit closer for the main circuit controlled by said electro-magnetic means, a latch associated with said circuit closer for retaining it in circuit opening position, and manual means for tripping the latch for permitting the main circuit to be closed when the shunt circuit is open.

2. The improvements herein described, comprising a main circuit, a shunt circuit, a magnetically operable member controlled by the shunt circuit for opening the main circuit when the shunt circuit is closed, a yielding latch normally in the path of said member for holding it in open position, and manually operable means for holding the latch out of the path of said member to permit the automatic closing of the main circuit upon the opening of the shunt circuit.

3. The improvements herein described, comprising a main circuit, a shunt circuit, an electro-magnetically operable member adapted to be lifted to break the main circuit upon the closing of the shunt circuit, a yielding latch normally in the path of said member for retaining same in raised position once the shunt circuit has been closed, even though the shunt circuit again opens, and manually operable means for holding the latch out of the path of said member to permit the automatic closing of the main circuit upon the opening of the shunt circuit, said means comprising a lever normally out of contact with said latch, a casing inclosing said device, and means extending outside said casing for operating said lever and adapted to be arranged to lock said lever in latch releasing position.

4. The improvements herein described, comprising a main circuit, a shunt circuit, electro-magnetic means controlled by the shunt circuit for breaking the main circuit when the shunt circuit is closed, and means operable at will to maintain the main circuit open and to permit it to close automatically when the shunt circuit is open.

5. The improvements herein described, comprising a main circuit, a shunt circuit, electro-magnetic means controlled by the shunt circuit for opening the main circuit when the shunt circuit closes, mechanical means for maintaining the main circuit open once it has been opened, said mechanical means being adjustable to permit the main circuit to close when the shunt circuit is again opened.

6. The improvements herein described, comprising a main circuit, a shunt circuit, electro-magnetic means controlled by the shunt circuit for opening the main circuit when the shunt circuit is closed, mechanical means for maintaining the main circuit open once it has been opened, and adjustable means for rendering said mechanical means inoperative and permitting the main circuit to close automatically upon the opening of the shunt circuit.

7. In a device of the kind described, a main circuit, a circuit closer for the main circuit, a shunt circuit, an electro-magnetic device in said shunt circuit adapted to open said main circuit closer upon the closing of the shunt circuit, a latch for maintaining the main circuit open, a casing inclosing said apparatus, a cord depending from the casing for releasing the latch to close the main circuit.

8. The improvements herein described, comprising a main circuit, a circuit closer for said main circuit, a shunt circuit, an electro-magnetic device in said shunt circuit adapted to open said main circuit closer when the shunt circuit is closed, a latch for maintaining the main circuit open, a casing inclosing said apparatus, a lever within the casing for releasing the latch, a cord depending from the casing and attached to said lever for actuating said lever to release the latch.

9. The improvements herein described, comprising a main circuit, a shunt circuit, a circuit closer for the main circuit, an electro-magnetic device in said shunt circuit adapted to open the main circuit closer when the shunt circuit is closed, a latch for maintaining the main circuit open, a casing inclosing said apparatus, a lever for releasing the latch, a cord depending from the casing and attached to said lever for actuating said lever and means associated with said cord for retaining the lever in latch releasing condition.

10. The improvements herein described, comprising a main circuit, a circuit closer for the main circuit, a shunt circuit, an electro-magnetic device in said shunt circuit adapted to open said circuit closer when the shunt circuit is closed, a latch for maintaining the main circuit open, a casing inclosing said apparatus, a lever in the casing for releasing the latch, a cord depending from the casing for operating said lever to release the latch, an abutment carried by the cord and a fork adapted to receive the cord and engage the abutment to retain the lever in latch releasing condition.

11. In combination, a main circuit, a shunt circuit, electro-magnetic means in the shunt circuit to open the main circuit upon the closing of the shunt circuit, said means being operable by gravity to close the main circuit upon the opening of the shunt circuit, a latch for retaining said main circuit open once the shunt circuit has been closed, a casing in which said apparatus is inclosed, a cord extending out through a hole in the casing, a bell crank within the casing having an arm for engagement with the latch for releasing same, a spring normally holding said arm out of latch engaging position, said cord connected to said bell crank and adapted when pulled to release said latch, a ball on said cord, a fork on said casing adapted to receive said cord and engage the ball to hold the lever in latch releasing condition.

In testimony whereof, I have hereunto set my hand this 1st day of February, A. D. 1918.

FREDERICK B. LITTLE.